(12) United States Patent
Neuner

(10) Patent No.: US 7,043,875 B1
(45) Date of Patent: May 16, 2006

(54) PLANT ARRANGEMENT WITH A HOLDER FOR OBJECTS THEREIN

(76) Inventor: Andreas Neuner, Austrasse 28, D-83646, Bad Tölz (DE)

( * ) Notice: Subject to any disclaimer, the term of this patent is extended or adjusted under 35 U.S.C. 154(b) by 0 days.

(21) Appl. No.: 09/856,407

(22) PCT Filed: Nov. 11, 1999

(86) PCT No.: PCT/EP99/08653

§ 371 (c)(1),
(2), (4) Date: Oct. 25, 2001

(87) PCT Pub. No.: WO00/30429

PCT Pub. Date: Jun. 2, 2000

(30) Foreign Application Priority Data

Nov. 19, 1998 (DE) ............................ 298 20 717 U
Jul. 21, 1999 (DE) ............................ 299 12 749 U

(51) Int. Cl.
*A10G 5/00* (2006.01)
(52) U.S. Cl. ..................................... 47/41.15
(58) Field of Classification Search ............... 248/27.8, 248/128, 131, 150, 153; 47/41.15, 41.11, 47/41.12, 55
See application file for complete search history.

(56) References Cited

U.S. PATENT DOCUMENTS

| | | | | |
|---|---|---|---|---|
| 649,874 A * | 5/1900 | Payne | .................. | 47/41.11 |
| 1,555,475 A * | 9/1925 | Maunz | .................. | 428/22 |
| 2,273,575 A * | 2/1942 | Hurlbut | .................. | 248/27.8 |
| 2,624,968 A * | 1/1953 | Polizzi | .................. | 41/12 |
| 3,301,516 A * | 1/1967 | Bruno | .................. | 248/176.1 |
| 3,481,075 A * | 12/1969 | Dastoli et al. | .................. | 47/41.01 |
| 3,634,180 A * | 1/1972 | DeCosmo et al. | .................. | 428/20 |
| 3,970,834 A * | 7/1976 | Smith | .................. | 362/123 |
| 4,281,211 A * | 7/1981 | Tatum et al. | .................. | 174/36 |
| 4,816,301 A * | 3/1989 | Weitz | .................. | 428/17 |
| 4,978,019 A * | 12/1990 | Maroudas et al. | .................. | 220/4.26 |
| 5,084,308 A * | 1/1992 | Luk | .................. | 428/17 |
| 5,150,874 A * | 9/1992 | Spiegel et al. | .................. | 248/514 |
| 5,435,787 A * | 7/1995 | Ratcliffe | .................. | 472/56 |
| 5,735,075 A * | 4/1998 | Honkawa et al. | .................. | 47/41.12 |
| 5,836,017 A * | 11/1998 | Hironaga et al. | .................. | 2/69 |
| 6,058,648 A * | 5/2000 | Kingston | .................. | 47/41.15 |
| 6,145,245 A * | 11/2000 | Honkawa et al. | .................. | 47/41.01 |
| 6,244,554 B1 * | 6/2001 | Baker | .................. | 248/312 |
| 6,326,551 B1 * | 12/2001 | Adams | .................. | 174/113 C |

FOREIGN PATENT DOCUMENTS

DE 3819981 A * 12/1989
JP 01207711 A * 8/1989

* cited by examiner

*Primary Examiner*—A. Joseph Wujciak
(74) *Attorney, Agent, or Firm*—Wood, Phillips, Katz, Clark & Mortimer

(57) ABSTRACT

The invention relates to securing gift items to a bouquet with the aid of a special support, preferably in the form of a wire bundle from which individual wires are splayed and provided with a mounted fastener to which the gift items can be adhered, for example.

10 Claims, 13 Drawing Sheets

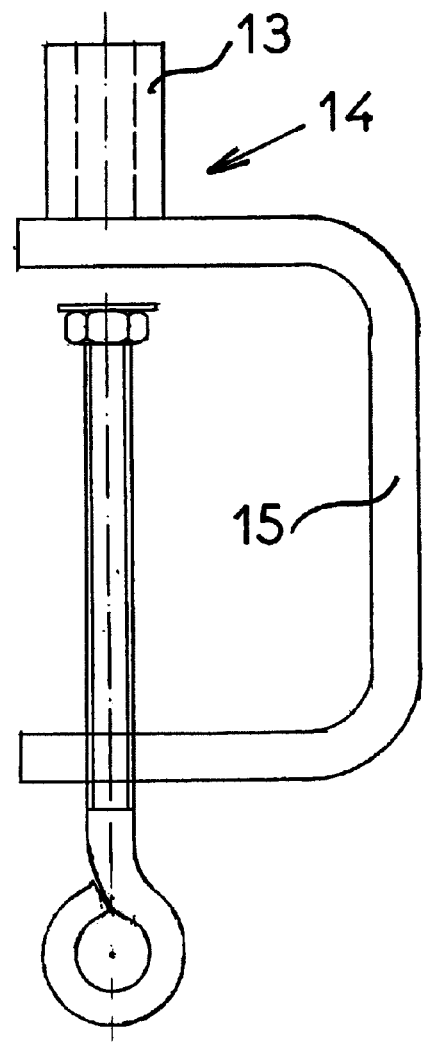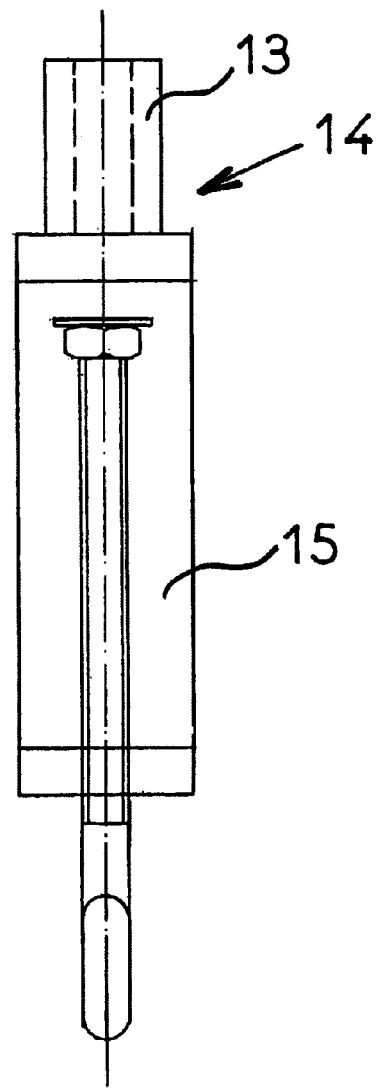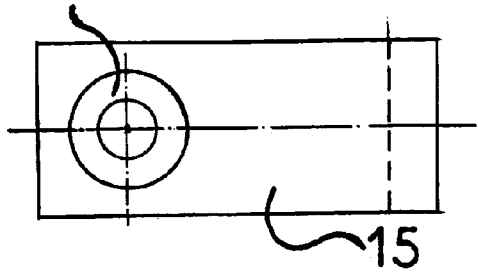

PLANT ARRANGEMENT WITH A HOLDER FOR OBJECTS THEREIN

The present invention relates to the configuration of a floral arrangement, especially of a bouquet.

Floral arrangements and bouquets of flowers and other plants are popular means of decoration which are commercially available as arranged by a florist or at home from garden produce and frequently presented as a gift.

The objective of the present invention is based on providing improved technical possibilities of configuring a floral arrangement.

For this purpose there is provided in accordance with the invention a floral arrangement comprising an integrated support for gift items. The support comprises a plurality of bendable supporting rods, circularly bundled and firmly held together at one end by a common supporting base, and at least one gift item secured to one of the supporting rods and held in the floral arrangement by the support.

The invention relates furthermore to a method of configuring one such floral arrangement with the gift item integrated therein in which the gift item is secured to a support comprising a plurality of bendable supporting rods, circularly bundled and firmly held together at one end by a common supporting base and the floral arrangement is arranged around the support.

In conclusion, the invention relates to a corresponding support for gift items in such a floral arrangement including a bundle of bendable supporting rods, circularly bundled and firmly held together at one end by a common supporting base for securing gift items in the floral arrangement.

The invention thus relates to both products and a method. Accordingly, the following description, including the aspects, is to be understood as implicitly disclosing both categories, even though not expressly emphasized.

The invention pertains, in general, to decorative floral arrangements of all kinds, but preferably to bouquets of flowers. To make for simplicity, the following merely makes reference to bouquets, which is not to be interpreted as being restricted thereto.

The gist of the invention is to permit much more diverse means of configuring bouquets, than hitherto, in finding a much wider and more favorable scope of application by enabling items other than flowers to be secured therein by technically favorable means. "Items" in this context are intended to cover all sorts of items other than flowers that can be arranged and secured to good effect in a bouquet, but especially such articles as, for example, goodies, miniature portions of jam or coffee or other delicacies, miniature bottles of drinks, e.g. hard drinks or sparkling wine, small playthings and typical baby articles, such as pacifiers and the like, indeed all items attractive for decorative reasons or desirable in a gift bouquet as a gift item or having symbolizing content.

Thus, as an alternative to the classic gift hamper the invention now makes it possible, for example, to arrange a smaller and thus more cost-effective variant in the form of a bouquet having added asthetic appeal whilst also being more handy and easier to transport than a gift hamper; it often being the case that such gift hampers are motivated more symbolically and need to be filled with a basically unwanted wealth of delicacies.

The classic bouquet presented as a token of gratitude when invited to a party can now be configured more ingeneous and individualized by it being integrated with small "non-floral" presents; this also having the appeal that these small gift items outlast the actual bouquet and are thus appreciated particularly with affection when the all to many flowers, as usually presented at such events, have wilted.

It is also possible that the non-floral gift items may take the form of small scrolls of paper expressing good wishes or a poem, or indeed as a banknote, which can now be presented to much better effect in a bouquet than in an envelope, etc.

In conclusion, bouquets may also be configured in accordance with a particular event, e.g. including small playthings and goodies as a present for children, the bouquet in this context making for added charm. For example, on the occasion of a marriage it is now possible to decorate a bouquet with pacifiers and the like.

Yet another possibility of making use of the invention outside of the gift area is in product presentation. Thus, products up to a critical size intended for presentation in a showroom or offered for sale or presented by a salesman can now be attractively arranged in such a bouquet. This makes for added attention particularly to products which are inherently less decorative and original in thus making them stand out from a large number of items on sale. It is thus conceivable, for example, for representatives for pharmaceutical products when visiting a hospital or physician to extend the products as a token and advertising gift in a bouquet decorated in accordance with the invention with trial packages of the pharmaceutical products concerned. Similar possibilities exist, of course, just as well for many other fields and products and relating more particularly to window dressing.

To enables these items, which are often heavier than the bouquet, to be secured and positioned decoratively and safely in the bouquet, a special support is provided in accordance with the invention comprising a plurality of supporting rods. The supporting rods are each connected to a common supporting base and serve to secure the items at a location remote from the supporting base.

Due to the items not needing to be secured to the individual flowers and the like of the bouquet itself, they instead being configured in and around the bouquet by a separate support for secure mounting, they can now be safely positioned and transported in view of their added weight and can also be much better secured to special decorative locations in the bouquet. Even when the bouquet has wilted and thus become limp, the arrangement of the items remains steady and maintains its visual appeal.

One advantage of the support in accordance with the invention, as compared to securing items on wires individual bent as required, is that by a dextrous arrangement of several items in the support the weight as a whole can now be distributed evenly, it being likewise possible, when securing more heavy individual items in the bouquet, to arrange these on opposite sides of the bouquet to create a certain counterbalance.

Yet another advantage is that the supporting rods of the support are interconnected so that no single supporting rod is able to twist out of place under the weight of the item secured thereto, in causing the item to slip down to the lowest position attainable by turning of the supporting rod.

In this arrangement the support is configured so that the supporting rods are bendable, i.e. preferably plastically bendable, in thus enabling each supporting rod and thus also the complete support to be adapted individually to the configuration as desired and also to the dimensions of the item to be secured thereto. For this purpose, the supporting rods may be made of wire, plastic-coated wire or the like. Preferred materials for the supporting rods are bright wire or steel wire varnished or refined in some other way, e.g. by copper-plating. Bright steel wire is an inexpensive solution offering high strength. Refining the wire prevents, for example, the water in which the bouquet stands from become rusty in appearance, which is, however, of no particular disadvantage. Pure copper wire is less favorable, due to it being too soft and, on the other hand, too expensive. Blued steel, as experience as shown, tends to be incompatible with plants, especially flowers, this applying likewise to galavanized steel. Unlike copper-sheathed steel wire, bright steel wire also has the not unsubstantial advantage nowadays of not being adulterated and thus condusive to recycling. Apart from this, steel is non-toxic for the environment and a raw material involving less energy in product than aluminum, for example.

In accordance with one special aspect of the invention securing the item to the supporting rod is facilitated by a special fastener which by its expansion and shape, on the one hand, offers better means of securing the item and, on the other, comprises a means for connecting to the supporting rod. It is particularly practical when the supporting rod can be inserted in at least two different directions into the fastener so that the fastener can be fitted by different ways and means geometrically.

One practical variant provides for the fastener having an adhesive surface area to which the item can be simply adhered. The adhesive connection is sufficiently durable and can be undertaken by the florist, housewife or any other person without proving a nuisance in securing a wealth of different items, i.e. in making the attachment as simple as possible in handling the support in accordance with the invention when attaching items to the bouquet. For this purpose, the adhesive surface area may be coated self-adhesive or also serve to secure the item with a double-sided sticky film or pad.

One material preferred for the fastener is polythene which, on the one hand, can be injection-molded at very low cost in practical shapes and, on the other is highly condusive to recycling.

When the plastics material used, for instance a suitable polythene, is relatively soft, there is in addition the advantage of the fastener, especially the adhesive surface area, being flexible in thus enabling it to be adapted to items which are not truly flat. In addition to polythene other soft plastics, including various sorts of rubber come into consideration. When the fastener, which is just as possible, is made of wood, metal or the like, this advantage of flexible adaptation is not available.

Prior to being bent to shape, the support comprises a bundle of rods of elongated shape and preferably oriented substantially in parallel to form, more particularly, a dense bundle of rods in contact with each other lengthwise. In this arrangement, the rods are directly connected to each other at one end. For example, one such support may be held together at one end of the bundle by a ferrule slipped over the bundle. One particularly simple and effective way of connecting the rods to each other is to crimp the ferrule to the bundle of rods. As an alternative to crimping, among other things, soldering, adhering, welding, twisting, potting are all possible, with or without the ferrule. On the other hand, it is quite possible to also configure the support in accordance with the invention in one piece, the term "secure connection" of the rods as used in the claims including, of course, this case of a one-piece configuration.

One favorable geometry for a dense bundle of rods in contact with each other intended to be held together, for example, by a round ferrule, is a symmetrical arrangement of six rods in cross-section which in turn features a round or hexagonal cross-section. This thus achieves a "hexagonal dense package" so-to-speak, for example including a center rod surrounded by six rods arranged symmetrical thereabout, or also including six further rods arranged between two each outer rods, i.e. totalling thirteen, or also with a total of nineteen rods. In general, however, a support including seven rods is quite sufficient, since it is seldom the case that more than seven items need to be secured thereto. It may, of course, prove useful in some cases to make use of two or more rods for a particularly secure attachment of a single item.

It is, of course, just as conceivable to make use of two or more supports in accordance with the invention for a floral arrangement or bouquet in accordance with the invention and the method for the production thereof.

Furthermore, a ring surrounding the bundle of rods may be provided for sliding up and down thereon to facilitate splaying individual rods from the bundle at some wanted position lengthwise along the bundle and to additionally hold the bundle together by being shifted to the lowermost position at which a rod is splayed. This ring may be, for example, a tubular piece fabricated from the same type of material as used for the ferrule already desired, for which here again bright steel or copper-plated steel tubing is given preference. To prevent the ring from slipping out of place, and thus to safeguard its location, it may also be made of plastics material or coated with plastics material or lacquered.

When bending the support in configuring the bouquet in and about the support, and when securing the items to the supporting rods, a stand may be used in accordance with the invention for the support which, for example, has a suitable opening to receive the ferrule holding the bundle together. By its standing surface area and own weight the stand is able to hold the support and the bouquet, or it may also be provided with a screw clamp for clamping to a table edge or the like. Preferably, this stand is not a part supplied with each support, it instead being purchased once, for example, by a florist and then made use of subsequently for a large number of bouquets.

In summary, the invention can thus be described as follows: what is involved is a rod assembly for integrating in bouquets and the like as a support for light to medium-weight items such as e.g. gift items secured to the rod assembly, whereby the rod assembly consists of a plurality of single rods bundled together circularly and firmly held together at the bottom end, above which the individual rods can be splayed and bent as required.

The invention will now be detailed by way of a preferred example embodiment as shown in the drawings whereby the features disclosed may be substantial to the invention singly or also in combinations of that as shown, and in which:

FIG. 12 is a front view of an alternative embodiment of a stand for the support as shown in FIGS. 1–6;

FIG. 13 is a side view of the stand as shown in FIG. 12;

FIG. 14 is a plan view of the stand as shown in FIGS. 12 and 13;

Figure 1:
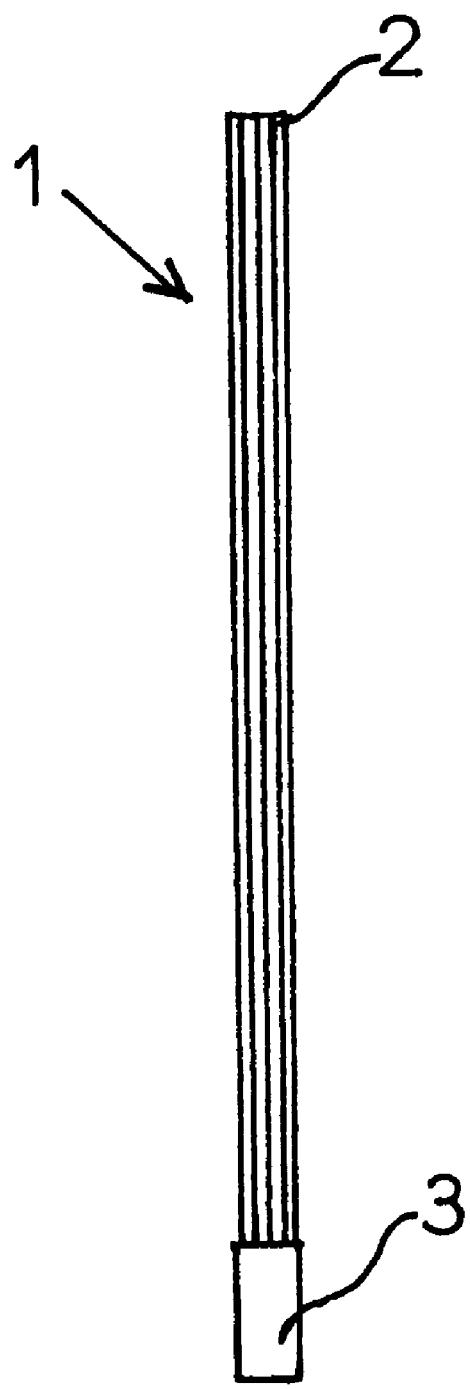
FIG. 1 is a side view of a support in accordance with the invention prior to it being splayed.
Figure 2:
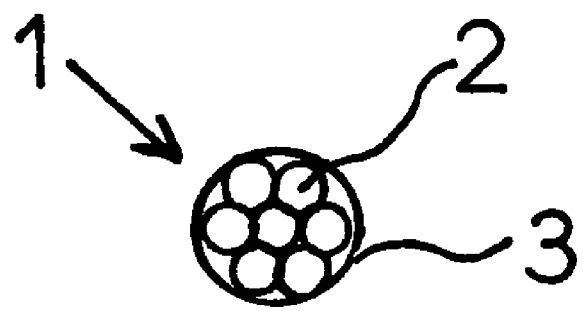
FIG. 2 is a plan view of the support as shown in FIG. 1.

Referring now to FIGS. 1 and 2 there is illustrated the support in accordance with the invention in its simplest basic form, comprising a bundle of rods 2, extending parallel to each other, which are firmly held together by means of a ferrule 3 (not shown in detail) slipped over one end and crimped in place. The connection made by the ferrule 3 prevents any rods 2 from being pulled or twisted out of place. However, the rods 2 may be plastically bent into practical any desired shape from the hexagonal arrangement as shown in FIG. 2 about a central identical round rod 2.

Figure 3:
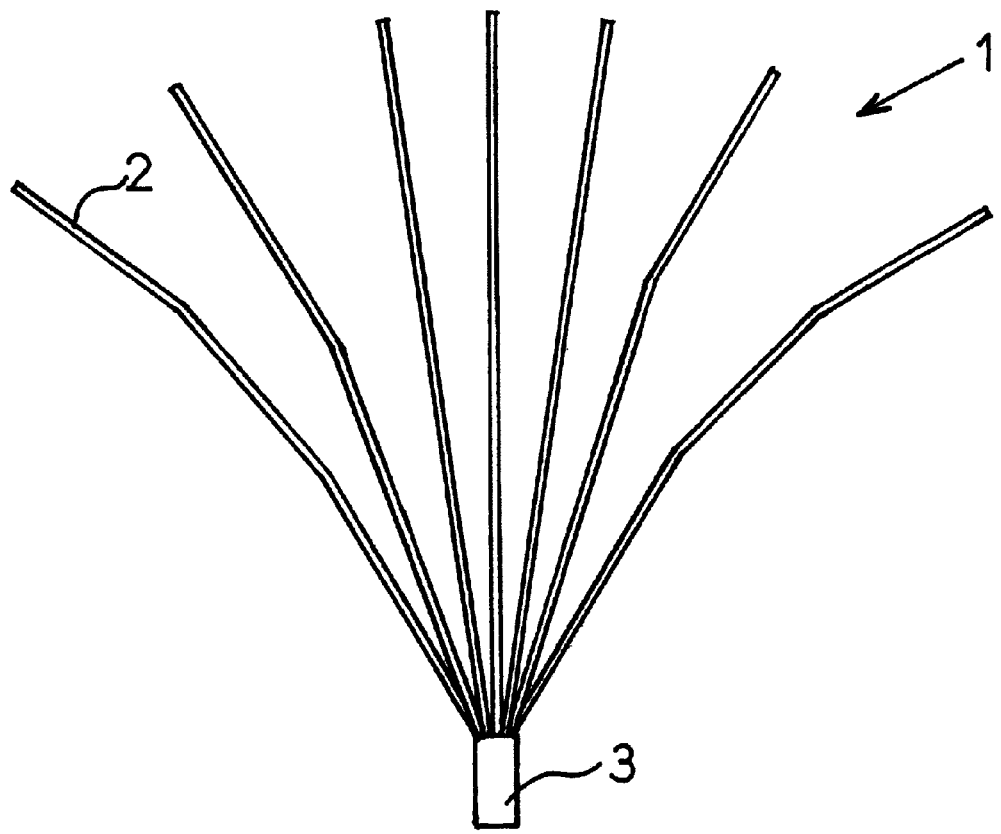
FIG. 3 is a view of the support corresponding to that as shown in FIG. 1, but in the splayed condition.

Referring now to FIG. 3 there is illustrated a simple splayed arrangement of the seven rods 2 whereby, of course, any other shape is also achievable in which the ends of the rods 2 end at any other greatly different level by suitably bending or cutting the rods to length.

Figure 4:
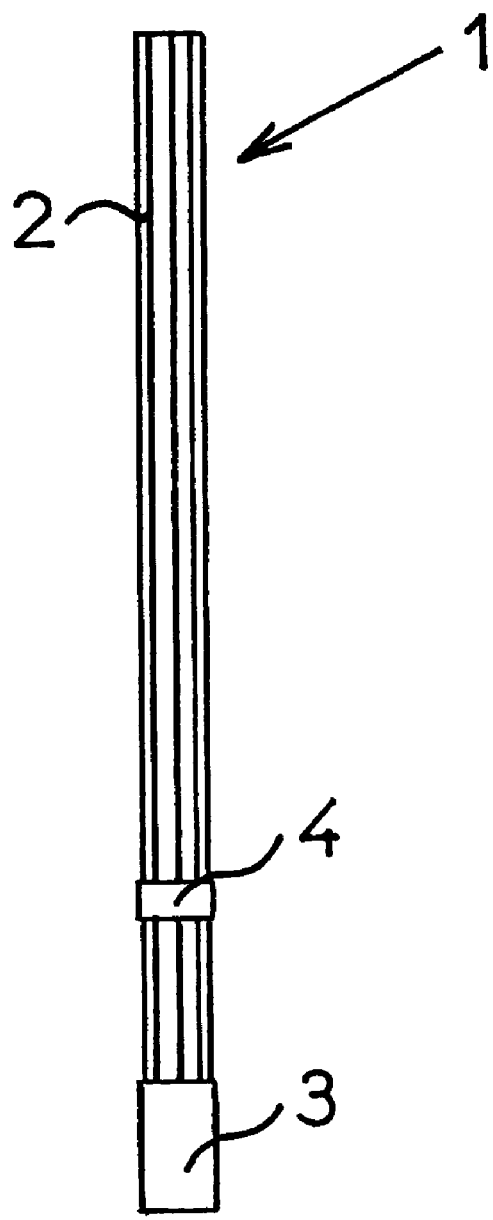
FIG. 4 is again a view of the support corresponding to that as shown in FIG. 1, but here with a ring slipped over the bundle of rods of the support.
Figure 5:
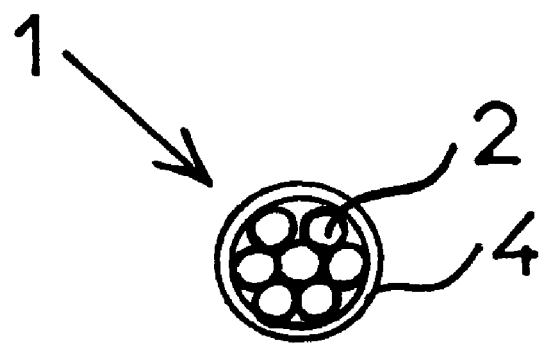
FIG. 5 is a view corresponding to that as shown in FIG. 2 but including the ring as shown in FIG. 4.
Figure 6:
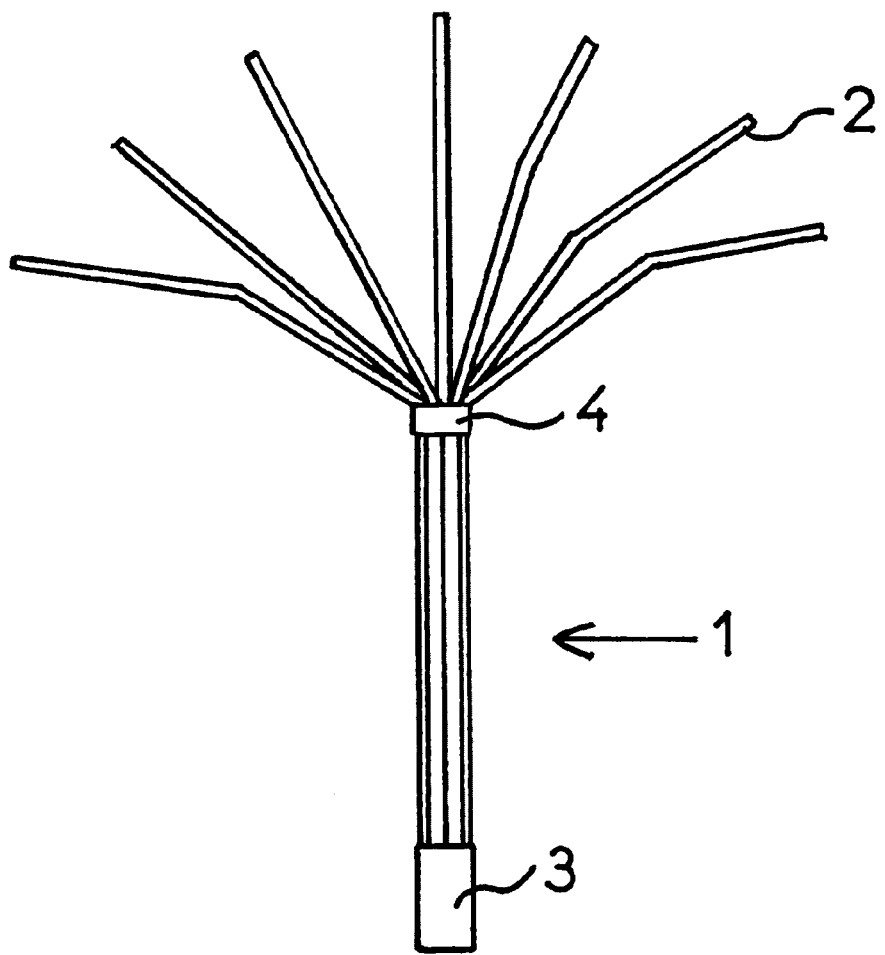
FIG. 6 is a view corresponding to that as shown in FIG. 3 but including the ring as shown in FIG. 4.

Referring now to FIGS. 4, 5 and 6, corresponding to the FIGS. 1, 2 and 3, there is illustrated how a ring 4 can be slipped over the bundle of rods 2—as shown in FIG. 6—to a special level to form a reference edge for splaying the rods 2 from the bundle. In this arrangement it is, of course, just as possible to shift the ring 4 lower down, after having splayed individual rods 2 to then splay further rods 2 at a different reference edge. In any case, however, the ring 4 at the end at which the rods 2 are held together, i.e. the ferrule 3, provides for the next such reference level for holding the bundle of rods 2 together to thus prevent a larger weight at any one rod end from splaying one of the rods 2 more than is desired.

Except for its length the ring 4 corresponds to the ferrule 3 but is not crimped in place and thus can be shifted up and down the rod bundle. The rods 2, ferrule 3 and ring 4 are all made of usual bright steel which, to prevent corrosion, may be lightly oiled.

Due to the hexagonal arrangement a round shape of the bundle of rods 2 is made possible which is easy to hold together by means of a usual tubular piece as ferrule 3. Bundles other than the hexagonal arrangement are of course, just as possible, more particularly cross-sectional shapes of the rods 2 other than round or hexagonal. Thus, the term "circular" bundle always refers in this context to a bundle having an approximately circular cross-section.

Figure 7:
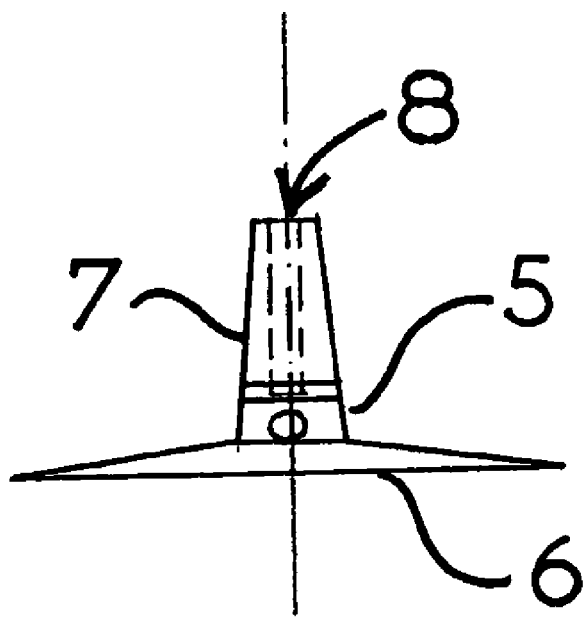
FIG. 7 is a front view of a fastener for the support as shown in FIGS. 1–6.
Figure 8:
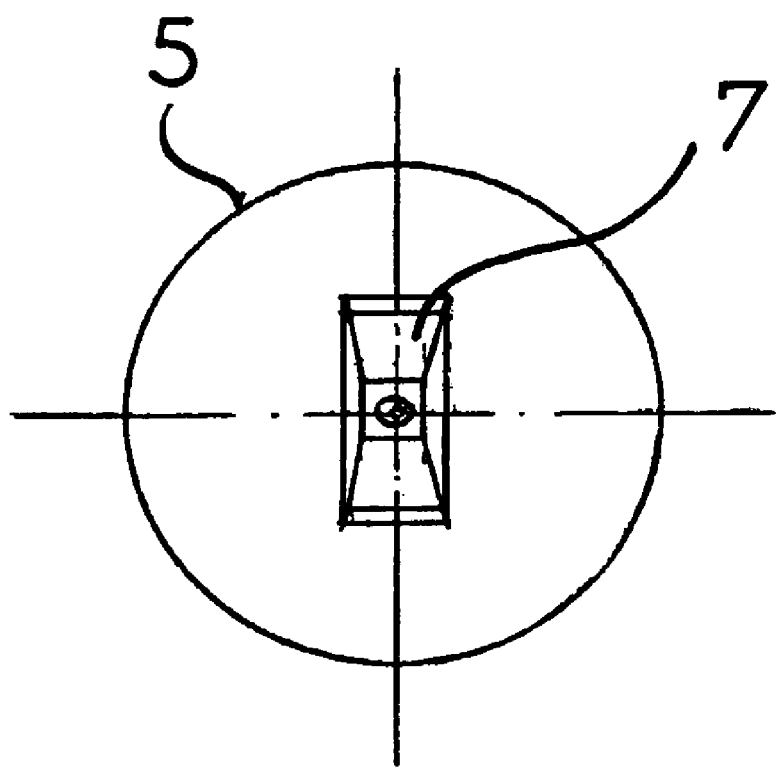
FIG. 8 is a plan view of the fastener as shown in FIG. 7.
Figure 9:
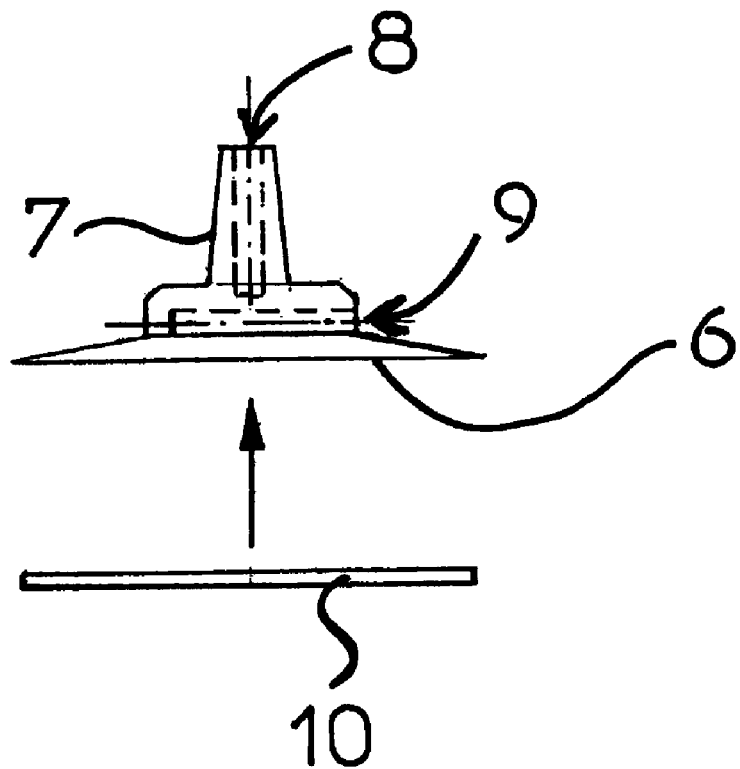
FIG. 9 is a side view of the fastener as shown in FIG. 7.

Referring now to FIGS. 7, 8 and 9 there is illustrated a typical fastener 5 including a large plane adhesive surface area 6 and a peg 7 contacting the adhesive surface area 6 by a flat and featuring two insertion openings 8 and 9 for optional insertion of the rods 2 as shown in FIGS. 1–6. Due to the insertion hole 9 located parallel to the adhesive surface area 6, the peg 7 comprises a base widened in one direction. The fastener 5 is injection-molded in PE.

Referring now to FIG. 9 there is illustrated a double-sided adhesive pad 10 shaped mainly like the adhesive surface area 6 and made of a flexible foamed material. With the adhesive pad 10 speedy and simple attachment of a great variety of items to the adhesive surface area 6 is possible. The flexibility of the foamed material enables the adhesive pad 10 to adapt to curved surfaces of items to be secured by a special surface area in thus assuring a good adherence. In addition, the fastener 5 illustrated in this case is so soft that it permits adapting to a certain extent to the curvature of the corresponding surface of the item being secured.

Figure 10:
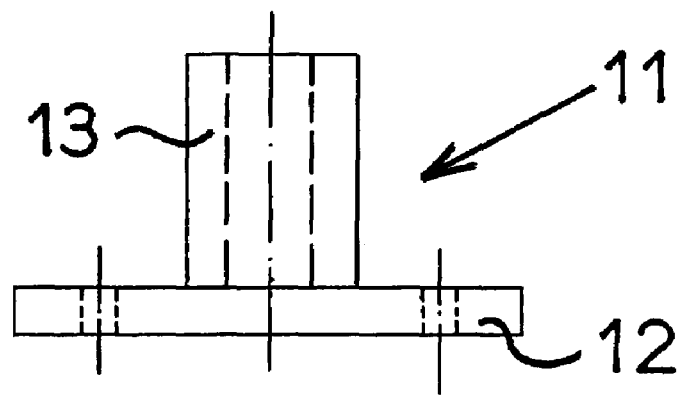
FIG. 10 is a side view of a stand for the support as shown in FIGS. 1–6.
Figure 11:
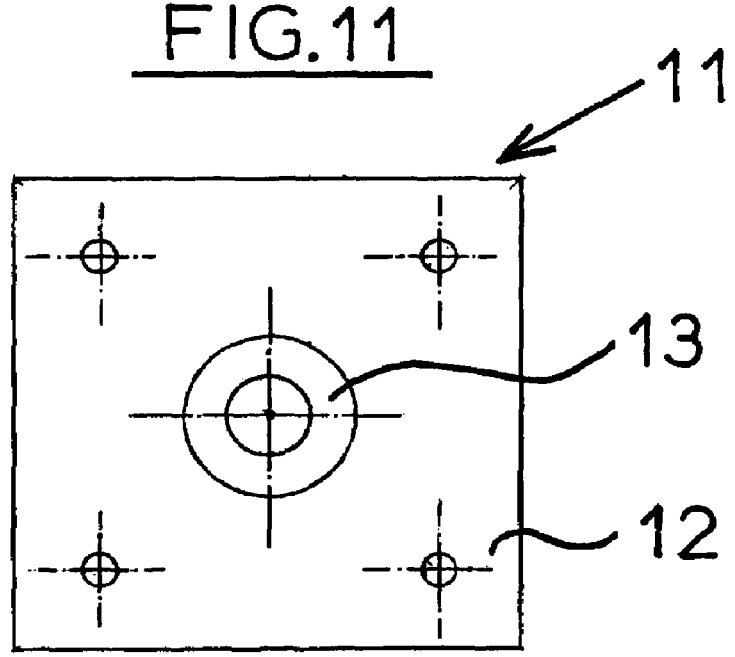
FIG. 11 is a plan view of the stand as shown in FIG. 10.

Referring now to FIGS. 10 and 11 there is illustrated a possible embodiment of a stand 11 for the support as shown. The stand 11 comprises a base plate 12 having four tappings for optional screw assembly to a table top or the like. A tubular piece 13 protrudes upright centrally from the base plate 12, the free inner cross-section of which corresponds to the ferrule 3 as shown in FIGS. 1 and 6 with a slight clearance. Thus, when the stand 11 is placed on a table, or is screwed or secured thereto by some other means, the support 1 can be simply inserted with the ferrule 3 into the tubular piece 13 for it to then stand upright securely held in place. This stand 11 too, is a simple metal part which to good effect is painted, although, of course, a plastics material part may be used just as well.

Referring now to FIGS. 12, 13 and 14 there is illustrated another variant 14 for a stand comprising a tubular piece 13 for inserting the ferrule 3 of the support 1 corresponding to the stand 11 as shown in FIGS. 10 and 11. In this case, however, the tubular piece 13 is applied to a screw clamp 15 for clamping to the edge of a table in the florist<<s shop, for example. Thus, as compared to the screw fastener of the stand 11 as shown in FIGS. 10 and 11, this makes for a securement which is easier to release and relocate. In this case too, this stand 14 may be made of metal and preferably painted, although, of course, using a plastics material, at least for part of the stand 15, is just as possible.

Figure 15:
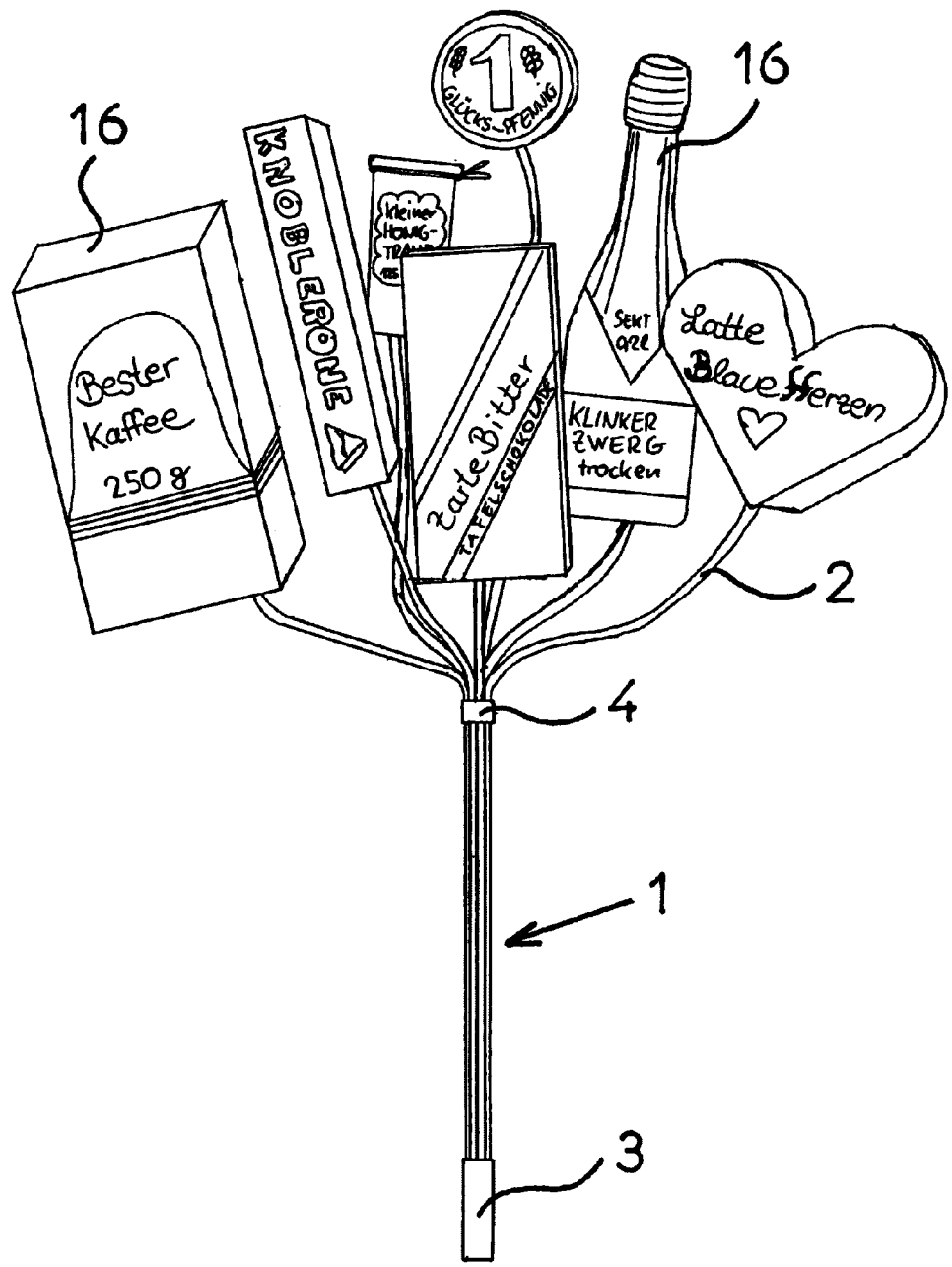
FIG. 15 is a diagrammatic illustration of the support as shown in FIGS. 4–6 including supporting rods bent to shape and showing items secured to the supporting rods by means of fasteners as shown in FIGS. 7–9.

Referring now to FIG. 15 there is illustrated how use is made of the support 1 in accordance with the invention as shown in FIGS. 4–6, it being evident how the individual rods 2 of the support 1 have been splayed from the bundle and individually bent to shape at a level as dictated by the ring 4. Attached to the ends of the individual rods 2 are fasteners 5 (not shown in FIG. 15) as evident from FIGS. 7, 8 and 9. Various items 16 are adhered to each of the adhesive surface area 6 via adhesive pad 10, these items being in this example miniature packages of delicacies, namely of coffee, chocolate and goodies as well as a miniature bottle of sparkling wine and a miniature glass of honey. Also indicated as a suitable item is a symbolized lucky penny on a magnified scale. It will be appreciated that, of course, any other item may be secured thereto, including gift items having a certain value intended to be presented within a bouquet in a decorative fashion simply by being attached thereto. For example, the support in accordance with the invention could likewise lend itself to securing small tools, electrical appliances, optical articles, etc.

Depending on the shape of each item 16 to be secured and its position in the overall arrangement, a choice can be made between the two insertion openings 8 and 9 of the fastener 5 and by appropriately bending the ends of the support rods in achieving an appealing geometry of the arrangement individually. In doing so, the support 1 is held in one of the stands 11 and 14 as shown in FIGS. 10 to 4 so that both hands are free to work the desired geometrical configuration.

Figure 16:
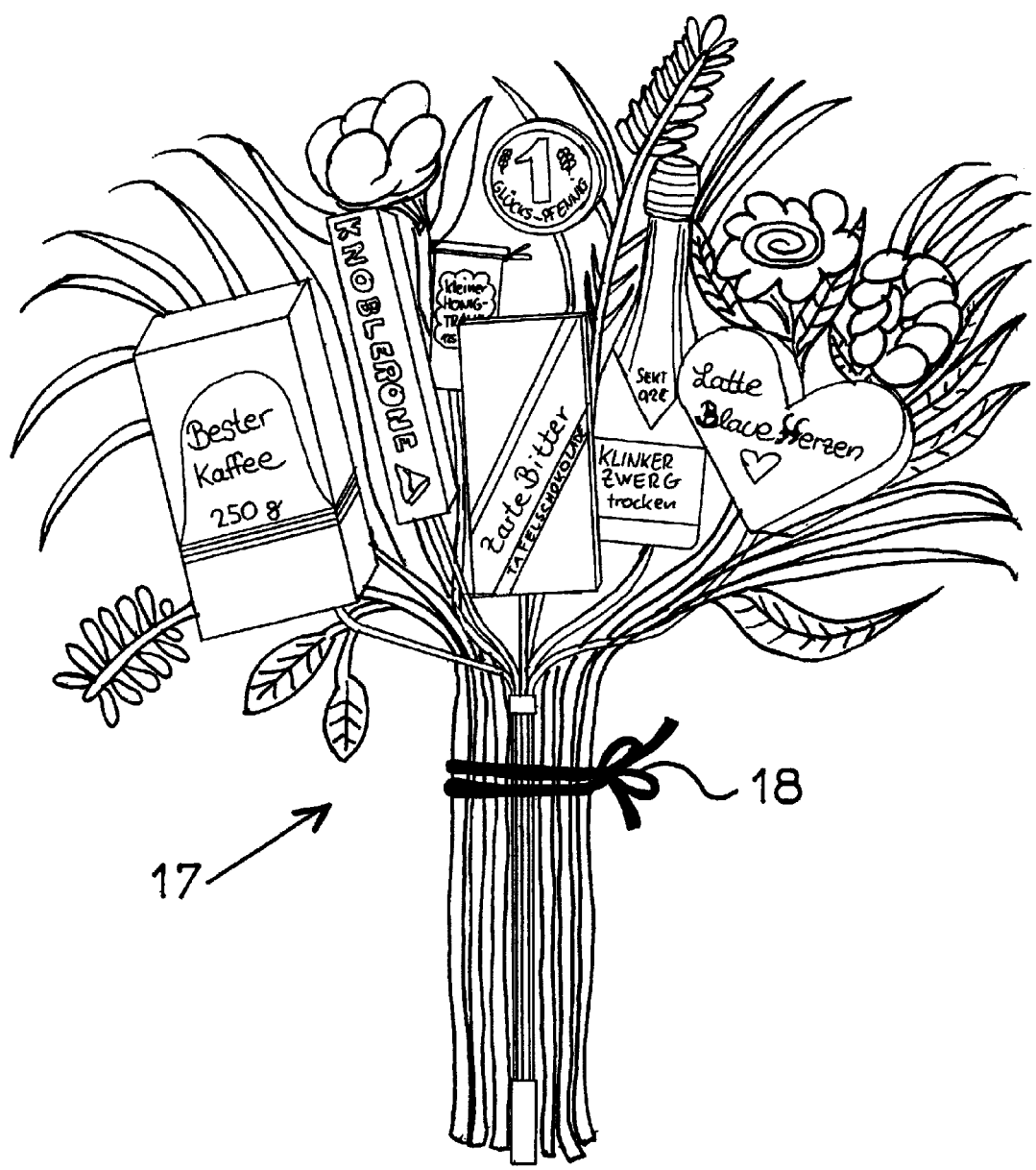
FIG. 16 is an illustration of a bouquet including the support integrated therein as shown in FIG. 15 and items supported in the bouquet by the support.

In principle the ensemble as shown in FIG. 15 of the items 16 held by the support 1 in accordance with the invention already makes for a decorative presentation and thus simply using the support 1 fitted out with the items would be enough. However, in referring now to FIG. 16 there is illustrated diagrammatically how this is preferably integrated in a bouquet. For this purpose the support 1 including the portion of the support rods between the ferrule 3 and the ring 4, i.e. the straight portion, is clasped in the bundle of floral stems, whereby for additional support a tie with a cord 18 could be provided, as shown in FIG. 16. Then, above the bundle from the straight portion of the support and floral stems a splayed presentation of the gift items within the floral arrangement materializes in the form of a bouquet 17 adorned with gift items. It is in this way that the bouquet 17 can be presented and also placed in flower vase. Where necessary, use is made of a base corresponding to the stand 11 as shown in FIGS. 10 and 11 to steady the bouquet in the vase, although this is not preferred in general due to the base spoiling the effect of the bouquet 17. When the vase is sufficiently narrow-necked, and as long as the arrangement of the items 16 is balanced, the bouquet will remain upright without any further expedients.

What is claimed is:

1. A bouquet of flowers including a bundle of floral stems and a support for non-floral items comprising at least three bendable supporting rods secured at one end circularly bundled by a common supporting base and including at least one non-floral item secured to one of said supporting rods and supported by said support in said bouquet, said support being integrated within said bouquet and means for clasping the supporting rods and the support in said bundle of floral stems.

2. The bouquet as set forth in claim 1 wherein said item is a gift item.

3. The bouquet as set forth in claim 1 wherein said supporting rods are made substantially of bright or refined steel wire.

4. The bouquet as set forth in claim 1 wherein said item is secured to said supporting rod via a fastener in which said supporting rod is inserted.

5. The bouquet as set forth in claim 4 wherein said item is adhered to an adhesive surface area of said fastener.

6. The bouquet as set forth in claim 4 wherein said fastener is made substantially of polyethylene.

7. A method of configuring a bouquet of flowers including a bundle of floral stems as set forth in claim 1 including a non-floral item integrated therein, comprising the following steps:
   a) securing said non-floral item to a support comprising a plurality of bendable supporting rods held at one end circularly bundled by a common supporting base and
   b) arranging said bouquet of flowers about said support, therein integrating said support within said bouquet and clasping it in said bundle of floral stems.

8. The method as set forth in claim 7 wherein said support is held in a stand in configuring said floral arrangement.

9. A bouquet of flowers including a bundle of floral stems and a support for non-floral items comprising a plurality of bendable supporting rods secured at one end circularly bundled by a common supporting base and including at least one non-floral item secured to one of said supporting rods and supported by said support in said bouquet, said support being integrated within said bouquet and means for clasping the supporting rods and the support in said bundle of floral stems, and wherein said item is secured to said supporting rod via a fastener in which said supporting rod is inserted, and wherein said supporting rod is insertable in two different directions into said fastener.

10. A method of configuring a bouquet of flowers including a bundle of floral stems including a non-floral item integrated therein, comprising the following steps:
   a) securing said non-floral item to a support comprising at least three supporting rods held at one end circularly bundled by a common supporting base and
   b) arranging said bouquet of flowers about said support, therein integrating said support within said bouquet and clasping it in said bundle of floral stems, wherein prior to individually bending said support as desired a shiftable ring is shifted to a desired level, resulting in said supporting rods being splayed and subsequently bent to shape from said bundle at the location of said ring.

* * * * *